United States Patent [19]

Bromme et al.

[11] Patent Number: 4,511,993
[45] Date of Patent: Apr. 16, 1985

[54] ARRANGEMENT FOR READING OUT DEFINED DATA FROM A DIGITAL SWITCHING DEVICE WITH MUTUALLY ASYNCHRONOUS CONTROL SIGNALS FOR SEQUENTIAL SWITCHING OF THE DEVICE AND TRANSFER OF THE DATA

[75] Inventors: Irmfried Bromme; Reinhold Brunner, both of Munich; Heinz Reimer, Tutzing, all of Fed. Rep. of Germany

[73] Assignee: Siemens Aktiengesellschaft, Berlin and Munich, Fed. Rep. of Germany

[21] Appl. No.: 374,247

[22] Filed: May 3, 1982

[30] Foreign Application Priority Data

May 11, 1981 [DE] Fed. Rep. of Germany ....... 3118621

[51] Int. Cl.³ .............................................. G06F 1/00
[52] U.S. Cl. .................................................. 364/900
[58] Field of Search ........................... 364/200, 900

[56] References Cited

U.S. PATENT DOCUMENTS

| | | | |
|---|---|---|---|
| 3,229,259 | 1/1966 | Barker et al. | 364/900 |
| 3,406,378 | 10/1968 | Bradford | 364/900 |
| 3,411,142 | 12/1968 | Lee et al. | 364/900 |
| 3,699,529 | 10/1972 | Beyers et al. | 364/200 |
| 3,810,103 | 5/1974 | Ricci | 364/900 |
| 3,909,791 | 9/1975 | van den Berg | 364/900 |
| 3,916,382 | 10/1975 | Martin et al. | 364/900 |
| 4,056,851 | 11/1977 | Hovagimyan et al. | 364/900 |
| 4,096,471 | 6/1978 | Agerhall et al. | 364/900 X |
| 4,159,497 | 6/1979 | Hilliard, Jr. et al. | 361/2 |
| 4,176,400 | 11/1979 | Heckel | 364/900 |
| 4,208,713 | 6/1980 | Berg | 364/200 |
| 4,241,398 | 12/1980 | Carll | 364/200 |
| 4,244,018 | 1/1981 | Mui | 364/200 |

OTHER PUBLICATIONS

Strangio, C., "Digital Transient Suppressor Eliminates Logic Errors", *Circuits for Electronics Engineers*, ed. Weber, S., p. 315 (1977).

Floyd, T., *Digital Fundamentals*, 2nd Ed., pp. 246-255 (1982).

*Primary Examiner*—Gareth D. Shaw
*Assistant Examiner*—Ronni S. Malamud
*Attorney, Agent, or Firm*—Herbert L. Lerner; Laurence A. Greenberg

[57] ABSTRACT

Arrangement for reading out defined data from a digital switching device with asynchronous control signals for sequential switching of the device and transferring of the data from another switching device. The arrangement includes circuits for applying a signal to the other switching device for sequentially switching the other device and a buffer memory for temporarily storing state variables of the first switching device and circuits for applying a read pulse to the second-mentioned switching device together with circuits for transferring the state variables stored in the buffer memory to the first-mentioned switching device. The arrangement further includes a cross-coupled gate arrangement including at least two cross-coupled gates of which the first one has an input impressible with a clock pulse and the second one has an input impressible with a read pulse, and wherein the first one gate has an output delivering a transfer signal, and circuitry for applying the transfer signal to an input of the buffer memory.

8 Claims, 7 Drawing Figures

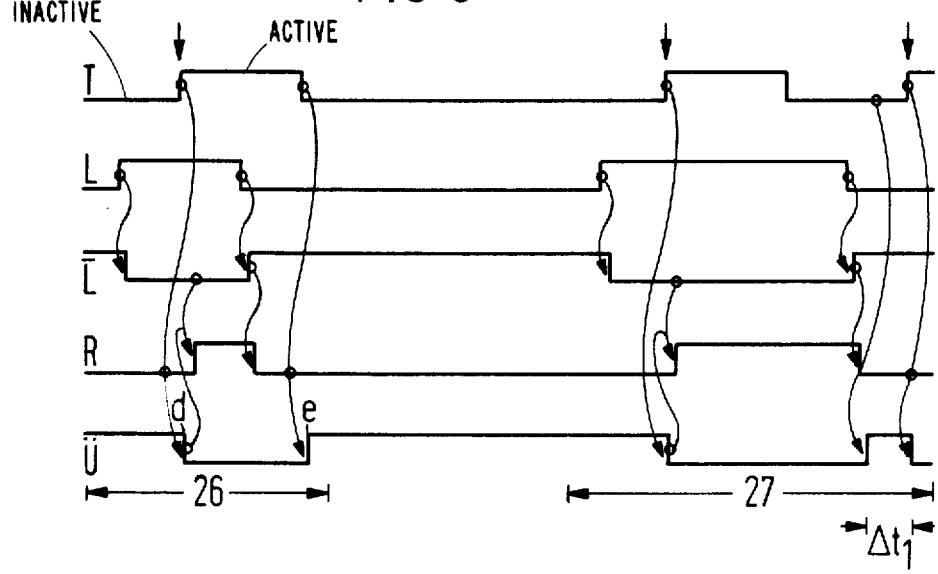
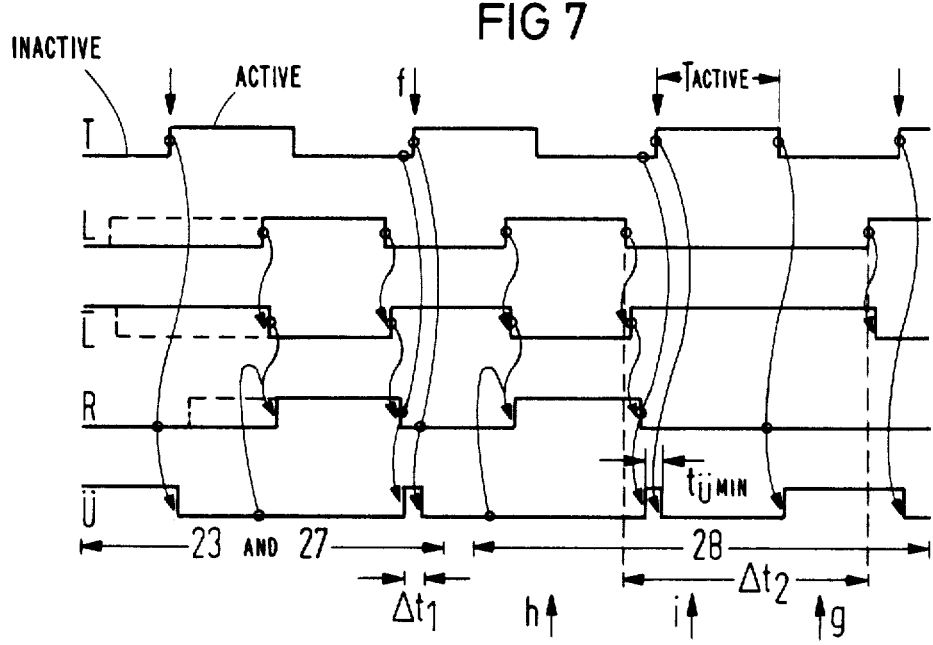

ARRANGEMENT FOR READING OUT DEFINED DATA FROM A DIGITAL SWITCHING DEVICE WITH MUTUALLY ASYNCHRONOUS CONTROL SIGNALS FOR SEQUENTIAL SWITCHING OF THE DEVICE AND TRANSFER OF THE DATA

The invention relates to an arrangement for reading out defined data from a digital switching device with mutually asynchronous signals for sequential switching of the device and transfer of the data from a further switching device. More particularly, the invention relates to an arrangement including a first switching device impressed with a signal that sequentially switches the first switching device; a buffer memory wherein state variables of the first switching device can be stored temporarily, and a second switching device to which a read pulse is applicable and into which the state variables of the buffer memory are transferrable.

When exchanging data among mutually independent digital systems, such as microprocessors, for example, having a mutually asynchronous timing relationship, and being operated without any transfer request and acknowledgement signals (e.g. STROBE and ACKNOWLEDGE) and without any transfer delay signals (e.g. WAIT, READY), respectively, or without any higher frequency controlled sync circuits, statistically distributed instants occur at which the data in the source system are, in fact, altered, if the target system is intended to transfer or evaluate the data. False or error data are thereby transferred or evaluated.

This problem becomes acute, for example, with digital switching devices which are sequentially switched by clock-pulse signals, and the state variables of which are to be transferred at any desired or required time to a second digital switching device or be evaluated by the latter in response to an evaluation signal. Such a switching device is generally used as an arrangement for executing logic sequences which has the capability of storing individual status or state variables, for example, counters, sequence controllers, microprocessors or the like.

The cause of the problem are the varying-length delay and switching times occurring with digital control or switching elements that are different, for the transfers from level one ("1") to level zero ("0") and from level zero to level one. Thus, for example, in n-channel MOS control elements, the transfer or transition from zero level to level one usually takes place more slowly than the transfer or transition from level one to zero level.

Heretofore, this problem has been solved in part by inserting between the first and second switching devices, a buffer memory, for example, a D flip-flop or a master-slave flip-flop, wherein the state variables of the first switching device are entered during the inactive times of the clock-pulse signal which sequentially switches the first switching device, and wherein during the active times of the clock-pulse signal these state variables of the first switching device are temporarily stored. A suitable arrangement can be constructed so that the clock-pulse signal which sequentially switches the first switching device is applied to the buffer memory via an inverter, and the clock pulse signal serving as a transfer signal, acts as a control signal so that the state variables of the first switching device are transferred to the buffer memory.

With this heretofore-known process, error or false data may nevertheless be received or evaluated by the second switching device if, at the beginning of entry of the altered state variables of the first switching device, which then already have their status established i.e. the variables thereof are already stable, a readout therefrom is made into the buffer memory or the contents of the latter are evaluated by the second switching device.

An improved heretofore-known solution is that the state variables of the switching device be introduced into the buffer memory only when the clock pulse sequentially switching the first switching device, and the read pulse and evaluation signal, respectively, of the second switching device, are simultaneously inactive. This can be accomplished, for example, by controlling, with control signals assumed to be one-active, meaning that the signal is active at the level one and inactive at level zero, the transfer of the state variables of the first switching device to the buffer memory through a transfer signal, which can be taken off at the output of a NOR-gate to which there is applied on the input side thereof, both the clock pulse applied by the first switching device, as well as the read or evaluate pulse applied by the second switching device.

This solution likewise results in errors if the interval between the occurrence of inactivity of the sequentially switched clock pulse and the occurrence of activity of the read and evaluate pulse, respectively, becomes so brief that a correct transfer of the state variables of the first switching device to the buffer memory cannot be assured.

A further solution is based on a repeated readout of the state variables of the first switching device followed by a check of the individual readout values for uniformity. If two sequential readout values are identical, it is assumed that a correct value is present, and a transfer to the second switching device and an evaluation, respectively, are performed. This process yields a correct result only if the time interval between two pulses of the sequentially switched clock pulses of the first switching device exceeds the time interval required for the necessary readout or checking operations. The prerequisite for another heretofore-known solution is that prior to the reading or evaluating of the state variables of the first switching device the sequentially switched clock thereof is blocked to eliminate any alteration. But this involves a variety of potential error conditions. Thus, for example, a clock pulse on the one hand can be so shortened by the blocking action that all of the state variables do not reach the correct status or condition thereof and, on the other hand, a clock pulse can be split into at least two pulses so that an unintentional sequential switching of the first switching device can occur. Furthermore, clock pulses can become lost.

A final possibility of preventing error or false data from being transferred and evaluated, respectively, is that of providing a buffer storage staged ahead of the readout or evaluation of the state variables of the first switching device. For this purpose, the buffer memory is impressed by a separate storage signal which controls the transfer of the state variable of the first switching device to the buffer memory. This process results in errors if the state variables of the first switching device are altered just during the temporary storage, and an invalid value is thus transferred.

Also, combinations of afore-described solutions do not result in a correct transfer, readout, or evaluation of the state variables of the first switching device at all instants of time.

It is accordingly an object of the invention to show a remedy for the foregoing problems and to provide an arrangement of the foregoing general type wherein, in mutually independent digital systems, the transfer and evaluation, respectively, of error or false data is eliminated.

With the foregoing and other objects in view, there is provided, in accordance with the invention, an arrangement for reading out well-defined data from a digital switching device with mutually asynchronous control signals for sequential switching of the device and transferring of the data from another switching device which comprises means for applying a signal to the other switching device for sequentially switching the other device; a buffer memory for temporarily storing state variables of the other switching device; means for applying a read pulse to the first-mentioned switching device; and means for transferring the state variables stored in the buffer memory to the first-mentioned switching device comprising a cross-coupled gate arrangement including at least two cross-coupled gates one of which has an input impressible with a clock pulse and the other of which has an input impressible with a read pulse, the one gate having an output delivering a transfer signal, and means for applying the transfer signal to an input of the buffer memory. Thus, with transfer of data between switching devices and digital systems, which are not synchronous with respect to one another, and which are controllable via an event pulse, such as a clock pulse or read pulse, for example, a transfer and readout, respectively, or an evaluation of the state variables of the first switching device can be permitted in the second switching device at any instants of time free of any error.

In accordance with another feature of the invention, the arrangement includes a differential stage connected to the other switching device, the clock pulse being fed through the differential stage to the switching device. This prevents the timing relationship from leading to unnecessarily lengthy delays or waiting times for the reading, evaluating and storing.

In accordance with a further feature of the invention, the arrangement includes means for applying a storage signal as a control signal to the input of the one gate for transferring the state variables from the other switching device to the buffer storage.

In accordance with an added feature of the invention, the two gates are a first and a second NOR-gate, the first NOR-gate having one input impressible by the clock pulse, and another input connected to an output of the second NOR-gate, the first NOR-gate having the output delivering the transfer signal to the input of the buffer memory, and the output of the first NOR-gate being also connected to another input of the second NOR-gate for applying the transfer signal thereto, the second NOR-gate having one input impressible by the read pulse, the read pulse being inverted by the first NOR-gate.

In accordance with an additional feature of the invention, the arrangement includes a third NOR-gate having a first input impressible with a storage signal as a control signal, and having a second input impressible by the read pulse, the third NOR-gate having an output connected to an input of the second NOR-gate, which is a different input than the input which is connected to the output of the first NOR-gate.

In accordance with again another feature of the invention, the arrangement includes means for inverting the clock pulse and applying it to a first input of a first NAND-gate, the first NAND-gate having a second input connected to an output of a second NAND-gate, the first NAND-gate having an output connected via an inverter to the buffer memory and being also connected to a first input of the second NAND-gate, the second NAND-gate having a second input impressible with the read pulse.

In accordance with again a further feature of the invention, the arrangement includes a third NAND-gate having a first and a second input, means for feeding a controlling storage signal via an inverter to the first input of the third NAND-gate, the second input of the third NAND-gate being impressible with the read pulse via an inverter, the third NAND-gate having an output connected to the second input of the second NAND-gate.

In accordance with another aspect of the invention, there is provided a method of operating an arrangement for reading out well-defined data from a digital switching device with mutually asynchronous control signals for sequential switching of the device and transferring of the data from another switching device which comprises applying a signal in the form of a clock pulse to the other switching device for sequentially switching the other device, temporarily storing state variables of the other switching device in a buffer memory, applying a read pulse to the first-mentioned switching device, and transferring the state variables stored in the buffer memory to the first-mentioned switching device, which comprises also applying the clock pulse to an input of one of a pair of cross-coupled gates, applying the read pulse to an input of the other gate, and applying a transfer signal from an output of the one gate to an input of the buffer memory, the read pulse having an active phase, the end of the active phase of the read pulse and the beginning of the active phase of a subsequent read pulse defining a time interval which exceeds the sum of the duration of the active phase of the clock pulse applied to the other switching device and a transfer time for transferring the state variables from the other switching device for storage in the buffer memory. This method of operation is especially applicable when switching devices are employed having short clock pulse times.

Other features which are considered as characteristic for the invention are set forth in the appended claims.

Although the invention is illustrated and described herein as embodied in an arrangement for reading out defined data from a digital switching device with mutually asynchronous control signals for sequential switching of the device and transfer of the data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 4 through 7 are graphical sequential illustrations of time lapses of control signals occurring, for example, in the embodiment according to FIG. 1.

Figure 1:
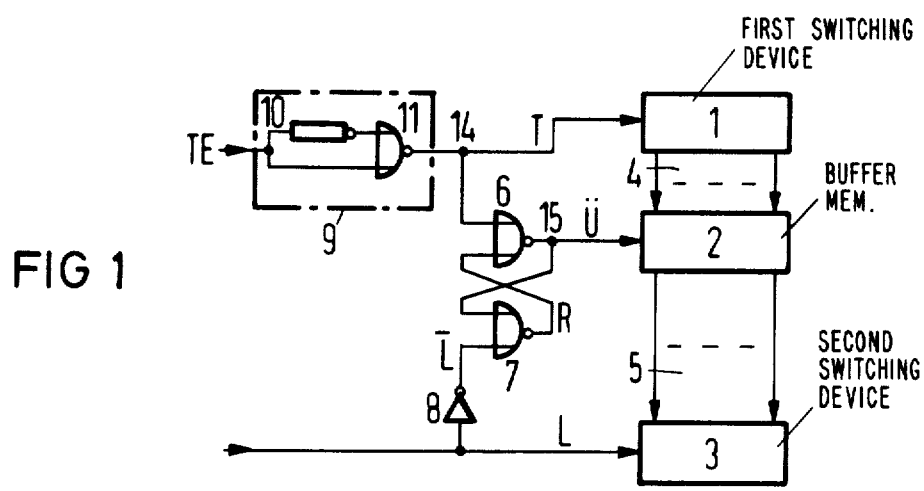
FIG. 1 is a block diagram of an embodiment consisting of a first and a second switching device with a buffer therebetween, and control elements according to the invention.

Referring now to the figures of the drawing and first, particularly, to FIG. 1, there is seen a first switching or controlling device 1, for example, a counter, which can be sequentially switched by a clock pulse T. The data stored in the first switching device 1 are fed to an intermediate memory or buffer storage through a number of data lines 4 corresponding to the number of data bits stored in the first switching device 1. The buffer memory 2 can be provided in the form of a number of flip-flops e.g. D-flip-flops corresponding to the number of data bits. The transfer of data representing variable states from the first switching device 1 to the buffer memory 2 is controllable in a conventional manner by a transfer signal Ü. The variable states or data, respectively, stored in the buffer memory 2 may be fed to a second switching device 3, such as a sequence or run-off controller, through data lines 5. The second switching device 3 is acted upon by a read signal L, which effects a readout or evaluation in the second switching device 3 of the variable states contained in the buffer memory 2.

In the foregoing and further embodiments of the invention, a "one-active" control signal is assumed, i.e., the transfer of the data variable states between the first switching device, the buffer memory and the second switching device, respectively, takes place during the level one, and the evaluation of the data takes place typically at the end of the active phase i.e. at the falling edge of the level one control pulse.

To assure the transfer of well-defined information from the first switching device 1 to the second switching device 3, a cross-coupled gate arrangement is provided, including a first NOR-gate 6 and a second NOR-gate 7 each having a first and a second input, the output of the first gate 6 acting upon the first input of the second gate 7, while the output of the second gate 7 acts upon the second input of the first gate 6. The cross-coupled gates 6 and 7 are connected in such a way that the clock pulse T is applied to the first input of the NOR-gate 6, the read signal L is invertedly applied through an inverter 8 to the second input of the second NOR-gate 7, and a transfer signal Ü taken from the output of the first gate 6 acts upon the buffer memory 2.

The switching devices 1 and 3 operate independently in regard to time, so that the clock pulse T and the read signal L are mutually asynchronous. If it is desired to keep the active phase of the clock pulse T as short as possible, the external clock TE available for acting upon the first switching device 1, can, if necessary or desirable, feed a clock pulse to the first switching device 1 through a differentiating stage 9 shown in FIG. 1 by broken lines. In an advantageous manner, the differential stage 9 is of such construction that only one edge of the external clock signal TE releases a pulse usable as a clock pulse T, so that, for example, the edge of the signal of the clock TE falling from "1" to "0" is differentiated, and thus the pulse duration, for example, is reduced from milliseconds to microseconds. To achieve a corresponding reduction in the active phase of the clock pulse T, the differentiating stage 9 can be so constructed that the external clock signal TE is fed, on one hand, to a delay stage 10 and, on the other hand, to the second input of a NOR-gate 11, and wherein the output of the delay stage 10 is invertedly fed to the first input of the NOR-gate 11, and the clock signal T acting upon the first input of the first gate·6, and upon the first switching device 1, is taken off the output of the NOR-gate 11.

The performance of the arrangement according to the invention shown in FIG. 1 is explained with reference to the time diagrams of FIGS. 4 through 7, which show, as a function of time, curves of the inverted read pulse $\bar{L}$ applied to the output of the inverter 8, curves of the feedback signal R applied to the output of the second gate 7, and curves of the transfer signal Ü as a function of the clock pulse T, and to the read signal L occurring in relation to the clock pulse T at varying times and at varying pulse durations or periods.

Figure 4:
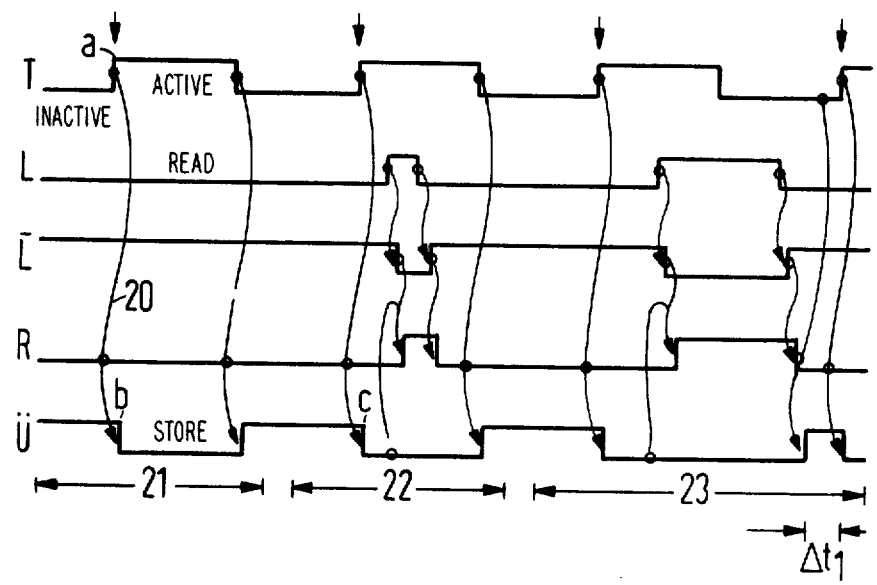

In a case 21 shown in FIG. 4, no read pulse L appears, and the pulse $\bar{L}$, therefore, has a level one and the feedback signal R a level zero. The clock pulse T is initially inactive and becomes active at the instant a i.e. the first switching device 1 is sequentially switched at the instant a (i.e. at the leading edge of the clock pulse T). The transfer signal Ü is active when the pulses T and R are inactive, as indicated by the arrow 20 and the respective two small circles, causing the data of the first switching device 1 to be transferred to the buffer memory 2. At the instant b which, because of gate transit times, lags behind point a, no data are accepted any more by the buffer memory, previously transferred data are stored. No data transfer error can occur in this case.

In a case 22 of FIG. 4, a read pulse L appears during the active phase of the clock pulse T. Any data stored at the instant a in the buffer memory 2 are therefore read out error-free therefrom.

In a case 23 of FIG. 4, the read pulse L becomes active also during the active phase of the clock pulse T; however, the read pulse L remains active longer than the control clock pulse T. A possible result thereof is that the time period $\Delta t_1$, during which the next data are transferred from the first switching device 1 to the buffer memory 2, could be too short for a safe transfer of the data because of the varying-length delay and switching times, differing from zero, for the transitions from level one to level zero and from level zero to level one. A case 24 shown in FIG. 5 corresponds to the case 23; however, the active phase of the read pulse L extends into the next active phase of the clock pulse T. In this case, no problems occur during data transfer.

Figure 5:
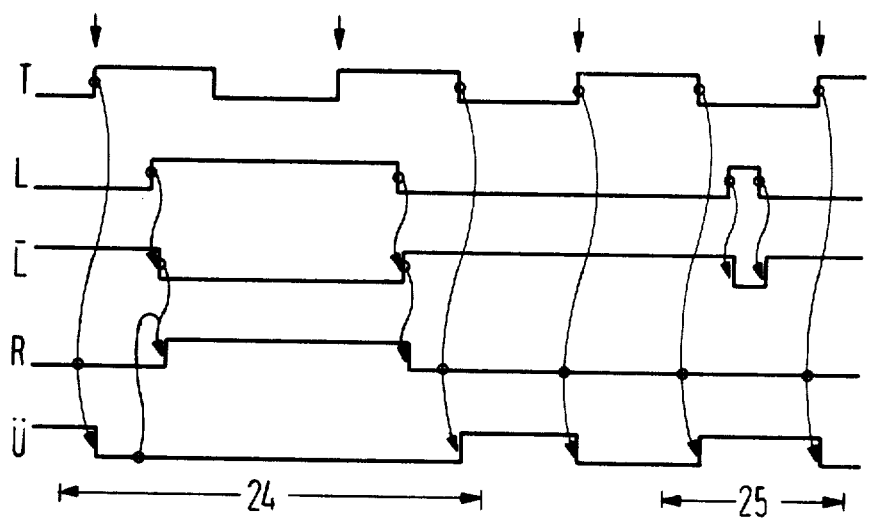

In a case 25 of FIG. 5, the read pulse L becomes active during the inactive phase of the clock pulse T, whereby no transfer errors can occur.

In a case 26 shown in FIG. 6, the read pulse L likewise becomes active during the inactive phase of the clock pulse T; however, the read pulse L extends into the next active phase of the clock pulse T. Because the data transferred from the first switching device 1 remain stored from the instant d to the instant e, no transfer error occurs likewise.

A case 27 of FIG. 6 corresponds to that of the case 26; however, the active phase of the read pulse L extends into the next inactive phase of the clock pulse T. As in the case 23, the time $\Delta t_1$ for the transfer of the data is possibly too short.

The critical cases 23 and 27 are data together in the left-hand part of FIG. 7, the solid lines corresponding to the case 23 and the broken lines to the case 27. It is apparent therefrom that the critical time $\Delta t_1$ for the transfer of the next data from the first switching device 1 to the buffer memory 2 becomes too short if the following switching edge (note arrow f) of the clock pulse T appears too early. The time $\Delta t_1$ is thus possibly too short for a transfer of the correct data value to the buffer memory 2 so that, at the instant h, an error value is stored in the buffer memory 2. This problem can be solved, as shown in FIG. 7 in the case 28, by a timing requirement which is to be adhered to, involving the interval between the end of a read or evaluate operation, and the start of a subsequent operation of this type. This is the case if the timing condition $$\Delta t_2 > T_{active} + t_{\ddot{u}\ min}$$

is maintained, where $\Delta t_2$ is the time between the end of an active phase of the read pulse L and the beginning of the next active phase of the read pulse L; $T_{active}$ is an active period of the clock pulse T; and $t_{\ddot{u}\ min}$ is the transfer time minimally required for switching data from the first switching device 1 to the buffer memory 2, assurance can then be had that, before a renewed start-up of the read process, the correct value of the data from the first switching device is transferred to the buffer memory 2. Furthermore, in case an error value is present in the buffer memory 2, at the instant h, then nevertheless, the aforementioned timing condition ensures that the correct value is transferred at the instant g and subsequently read out.

With the use of independent microcomputers as switching devices, the timing condition for $\Delta t_2$, based upon computer timing conditions during the command continuity or process can be automatically satisfied. Proceeding from a $T_{active}$ duration of 1 $\mu$s, and from a transfer time $t_{\ddot{u}\ min}$ of 100 ns determined by technology dependent switching parameters then, for example, with microcomputers of the SAB 8085 type, such as is described in SIEMENS, User's Manual, Sept. 1978, MCS-85, Order No. B 2 010.101, the timing condition for $\Delta t_2$ is automatically satisfied. Proceeding from microcomputers with a higher command processing speed, such as, for example, the SAB 8086 type described in SIEMENS, SAB 8086 Family User's Manual, Oct. 1979, MCS-86, Order No. B/2184-101, then, if necessary attention must be given to the timing condition for $\Delta t_2$. This may be effected, for example, by introducing or inserting additional commands, such as no-operation (NOP) commands, for example, into the program.

Figure 2:
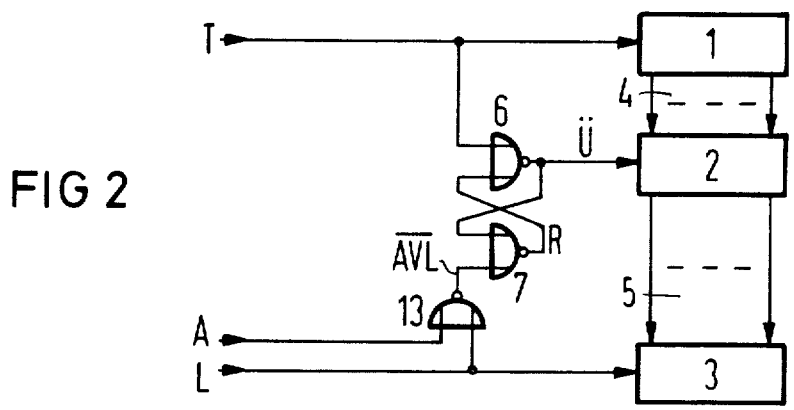
FIG. 2 is a block diagram, similar to FIG. 1, but suited especially for data transfer between microcomputers.

If an arrangement is provided for exchanging data between two mutually independent switching devices 1 and 3, wherein, for the storage in the buffer memory 2, a separate storage pulse A independent of the read pulse L and generated in a conventional manner as to software or hardware e.g. through a microcomputer, is used, then the embodiment according to the invention shown in FIG. 1 can be modified in accordance with FIG. 2. In accordance with the exemplified embodiment shown in FIG. 2, wherein in comparison with FIG. 1, like components have identical reference symbols, instead of the inverter 8 used in FIG. 1, a NOR-gate 13 is used, the first input of which is impressed with the storage pulse A, and the second input of which is impressed with the read pulse L. The output of the gate 13, analogously to the inverter 8, is connected to the second input of the second NOR-gate 7. The time interval between the end of a read or store operation and the start of a following operation of this type must be selected so that it exceeds the sum of the active phase of a control pulse T and the minimal transfer time $t_{\ddot{u}\ min}$. To prevent this timing condition from producing unnecessarily long waiting periods for the read, evaluate or store operations, the active pulse phase, just as in the case of the exemplified embodiment of FIG. 1, must be as brief or short as possible, which can be accomplished, if necessary, in accordance with FIG. 1, by differentiation of the external-sequentially switched clock signal TE.

Figure 3:
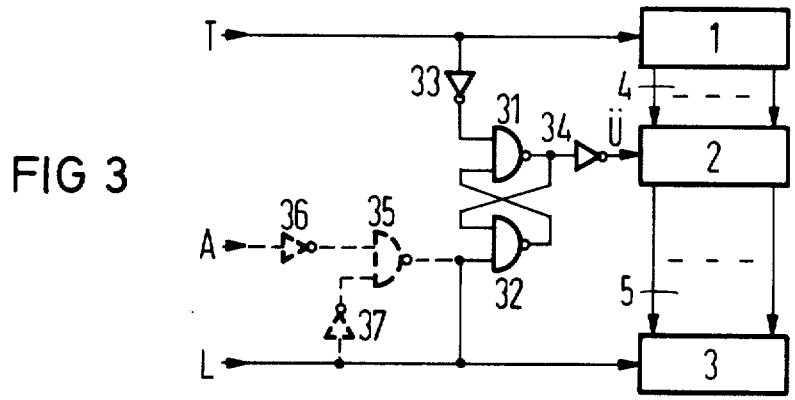
FIG. 3 is a block diagram according to FIG. 2, but using NAND-gates instead of NOR-gates for control elements.

The construction of a cross-coupled gate arrangement according to the invention is not limited to an arrangement formed of NOR-gates as shown in FIG. 1 and 2. A further exemplified embodiment using a NAND-gate is shown in FIG. 3. The cross-coupled gate arrangement according to FIG. 3 is formed of a first NAND-gate 31 having an output which, on the other hand, is connected to the first input of a second NAND-gate 32 and, on the other hand, is applied to the buffer memory 2 via an inverter 34 carrying a transfer pulse Ü. The clock pulse T, which is obtained, if necessary, by the differentiation of the external clock signal TE and which sequentially switches the first switching device 1, is applied to the first input of the first NAND-gate 31 via the inverter 33, while the read pulse L controlling the second switching device 3 is applied to the second input of the second NAND-gate 32, the output of which is connected to the second input of the first NAND-gate 31.

If an arrangement is provided for the exchange of data between two mutually independent switching devices 1 and 3, wherein, for the storage in the buffer memory 2, a separate storage pulse A independent of the real pulse L and generated in a conventional manner as to software or hardware e.g. by a microcomputer, is used, then the embodiment of the arrangement according to the invention shown in FIG. 3 can be modified by the elements 35, 36, and 37 shown in broken lines. Instead of the direct connection of the read pulse L to the second input of the NAND-gate 32, a NAND-gate 35 is used, the first input of which is impressed by the storage pulse A via the inverter 36, and the second input of which is impressed by the read pulse L via the inverter 37. The output of the gate 35 is connected to the second input of the second NAND-gate 32. The time interval between the end of a read or store operation and the start of a following operation of this type must be selected so that it exceeds the sum of the active phase of a control pulse T and the minimal transfer time $t_{\ddot{u}\ min}$.

For the operation of the exemplified embodiment shown in FIG. 3, the descriptions of FIGS. 1 and 2 are accordingly applicable. If, differing from FIGS. 1 through 3, no one-active control pulses are used, then the arrangements employed in the illustrated exemplified embodiment can be supplemented by the interposition and corresponding omission, respectively, of inverters. When using a zero-active clock pulse T, an inverter can be interposed, for example, in FIG. 1 between the point 14 and the first input of the gate 6. When using a zero-active transfer pulse Ü, an inverter can be interposed, for example, between the point 15 and the buffer memory 2, whereas with a zero-active read pulse L, the use of the inverter 8 can be dispensed with.

The foregoing is a description corresponding to German Application P 31 18 621.1, dated May 11, 1981, the International priority of which is being claimed for the instant application, and which is hereby made part of this application. Any discrepancies between the foregoing and the aforementioned corresponding German application are to be resolved in favor of the latter.

We claim:

1. Arrangement for transfer of well-defined data from a first switching device to a second switching device, wherein the first switching device is driven by a first clock and the second switching device is driven by a second clock and wherein the first and second clocks are mutually asynchronous, the arrangement which comprises:

- an output data storage being a part of the first switching device for storing the well-defined data to be transferred;
- an input data storage being a part of the second switching device for receiving the data to be transferred;
- a buffer storage for temporarily receiving and holding the data from the output data storage and subsequently transferring the data to the input data storage;
- a clock pulse T synchronous with said first clock, operatively engaging said first switching device for initiation of the transfer of data from said output data storage to said buffer storage;
- a read signal L synchronous with said second clock operatively engaging said second switching device, for initiating the transfer of said data;
- a cross-connected latching gate arrangement having at least a first and a second gate, each having a first and a second gate input and an output;
- said first input of said first gate operatively responsive to said clock pulse T, said second output of said second gate operatively responsive to said read pulse L;
- said output of said first gate operatively producing receive signal Ü for engaging said buffer storage for receiving said data from said output storage.

2. Arrangement according to claim 1, further comprising a differentiating stage connected to the first switching device, the clock pulse being feedable through said differentiating stage to said first switching device.

3. Arrangement according to claim 1, further comprising means for applying a storage signal as a control signal to the first input of the first gate for transferring the data from the first switching device to the buffer storage.

4. Arrangement according to claim 1, wherein said at least two gates comprise a first and a second NOR-gate, said first NOR-gate being said first gate having said first input impressible by the clock pulse T, and said second input connected to the output of said second NOR-gate, said output of said first NOR-gate delivering the transfer signal U̅ to said input of the buffer memory, said output of said first NOR-gate being also connected to the first input of said second NOR-gate for applying the transfer signal thereto, said second NOR-gate being said second gate and having said input impressible by the read pulse L̅, the read pulse being inverted.

5. Arrangement according to claim 4, further comprising a third NOR-gate having a first input impressible with a storage signal A as a control signal, and having a second input impressible by the read pulse L̅, said third NOR-gate having an output connected to the second input of the second NOR-gate the first input thereof which is connected to the output of said first NOR-gate.

6. Arrangement according to claim 1, wherein said first and second gates are a first NAND-gate and a second NAND-gate, further comprising a first and a second inverter and means for inverting the clock pulse T and applying it to the first input of the first NAND-gate, said first NAND-gate having a second input connected to an output of a second NAND-gate, said first NAND-gate having an output connected via an inverter to the buffer memory and being also connected to a first input of said second NAND-gate, said second NAND-gate having a second input impressible with the read pulse L̅.

7. Arrangement according to claim 6, further comprising a third NAND-gate having a first and a second input and an output and a first and a second inverter and, means for feeding a controlling storage signal A̅ via the first inverter to said first input of said third NAND-gate, said second input of said third NAND-gate being impressible with the read pulse L̅ via the second inverter, said third NAND-gate having said NAND-gate output connected to said second input of said second NAND-gate.

8. Method for operating an arrangement for reading out well-defined data from a first digital switching device for transferring data to a second switching device with mutually synchronous control signals for sequential switching of the device the method which comprises applying a signal in the form of a clock pulse to the first switching device for sequentially switching the first device, temporarily storing state variables of the first switching device in a buffer memory, applying a read pulse to the second switching device, and transferring the state variables stored in the buffer memory to the second switching device, which comprises also applying the clock pulse to an input of one of a pair of cross-coupled gates, applying the read pulse to an input of the other of said gates, and applying a transfer signal from an output of the first gate to an input of the buffer memory, the read pulse having an active phase, the end of the active phase of the read pulse and the beginning of the active phase of a subsequent read pulse defining a time interval which exceeds the sum of the duration of the active phase of the clock pulse applied to the first switching device and a transfer time for transferring the state variables from the first switching device for storage in the buffer memory.

* * * * *